United States Patent
Hewitt et al.

(10) Patent No.: US 9,033,322 B2
(45) Date of Patent: May 19, 2015

(54) MECHANICAL TENSIONER STRUT WITH UNI-DIRECTIONAL FRICTION DAMPING

(71) Applicant: Schaeffler Technologies AG & Co. KG, Herzogenaurach (DE)

(72) Inventors: Jeffrey Hewitt, Windsor (CA); Lucian Botez, Novi, MI (US); Eric Berndt, Whitefish Bay, WI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 49 days.

(21) Appl. No.: 14/044,922

(22) Filed: Oct. 3, 2013

(65) Prior Publication Data

US 2014/0097563 A1 Apr. 10, 2014

Related U.S. Application Data

(60) Provisional application No. 61/711,781, filed on Oct. 10, 2012.

(51) Int. Cl.
*B60G 13/00* (2006.01)
*F16H 7/08* (2006.01)
*F16F 13/00* (2006.01)
*F16F 7/09* (2006.01)

(52) U.S. Cl.
CPC ............ *F16H 7/0831* (2013.01); *F16F 13/005* (2013.01); *F16H 2007/0806* (2013.01); *F16H 2007/084* (2013.01); *F16F 7/095* (2013.01)

(58) Field of Classification Search
USPC ............ 276/136, 140.11–140.13, 141–141.7, 276/195, 196, 201–205; 188/266, 381
See application file for complete search history.

(56) References Cited

U.S. PATENT DOCUMENTS

| | | | |
|---|---|---|---|
| 4,606,442 A | 8/1986 | Paton et al. | |
| 4,691,890 A * | 9/1987 | Han | 248/412 |
| 5,720,369 A * | 2/1998 | Thorn | 188/300 |
| 5,951,423 A | 9/1999 | Simpson | |
| 6,612,408 B2 | 9/2003 | Serkh et al. | |
| 6,702,266 B1 * | 3/2004 | Dec | 267/205 |
| 2002/0025869 A1 * | 2/2002 | Serkh et al. | 474/135 |
| 2003/0051956 A1 * | 3/2003 | Serkh et al. | 188/322.14 |
| 2012/0018962 A1 * | 1/2012 | AC et al. | 280/5.5 |

* cited by examiner

*Primary Examiner* — Vishal Sahni
(74) *Attorney, Agent, or Firm* — Simpson & Simpson, PLLC (57) ABSTRACT

A strut including a housing, a plunger within a space in the housing and including a tapered outer circumferential surface, a primary spring engaged with the housing, a wedge element within the space and including a tapered inner circumferential surface engageable with the outer circumferential surface, and a secondary spring engaged with the wedge element and the plunger to urge the plunger in an axial direction. The primary spring urges the plunger in the axial direction with a first force. In a fully extended mode, the plunger is maximally displaced in the axial direction. In a contracted mode, the plunger is displaced in an opposite axial direction in response to application of a second force, sufficiently greater than the first force, on the plunger in the opposite axial direction. When the second force is sufficiently decreased, the plunger displaces with respect to the housing in the axial direction.

9 Claims, 11 Drawing Sheets

MECHANICAL TENSIONER STRUT WITH UNI-DIRECTIONAL FRICTION DAMPING

CROSS-REFERENCE TO RELATED APPLICATIONS

This application claims the benefit under 35 U.S.C. §119 (e) of U.S. Provisional Application No. 61/711,781, filed Oct. 10, 2012, which application is incorporated herein by reference in its entirety.

TECHNICAL FIELD

The present disclosure relates to a mechanical tensioner strut with a displaceable wedge and secondary spring to enable increased dampening.

BACKGROUND

Mechanical tensioner struts are used to absorb or dampen force applied to the strut in a first direction by displacing a first component, to which the force is applied, in the first direction with respect to a fixed component of the strut. For example, struts are used to modulate force and vibration associated with operation of chain systems. A spring for the strut opposes the displacement of the first component in the first direction and the degree of displacement of the first component is a function of the relative magnitude of the applied force with respect to the spring force. Upon release or reduction of the force, the spring displaces the first component in a second direction, opposite the first direction, with respect to the fixed component. It is desirable to eliminate or minimize dampening of the first component in the second direction. That is, ideally, the dampening of the strut is uni-directional only in the first direction.

To maximize dampening in the first direction, frictional forces generated by contact of the first component with other components of the strut are maximized. However, maximizing these frictional forces maximizes forces which lock the first component in a contracted position (displaced a maximum distance in the first direction). If these forces are too great, the spring is unable to displace the first component in the second direction when the force in the first direction is reduced or removed. Further, even if the spring is able to displace the first component in the second direction when the force in the first direction is reduced or removed, the frictional forces may still be present during the displacement in the second direction, resulting in undesirable dampening in the second direction.

U.S. Pat. Nos. 6,702,266; 6,612,408; 5,951,423; and 4,606,442 as well as U.S. Patent Application Publication No. 2002/0025869 disclose the use of complementarily angled and mating respective surfaces for components engaged during operations to dampen a force applied in a first direction. Decreasing the complementary angles increases desired dampening. However, to prevent the surfaces from locking together (due to frictional and compressive forces), which would prevent desired displacement in a second opposite direction when the force is reduced or removed, or would result in undesirable dampening in the second direction, the angles must be kept relatively large. That is, if the angles are too small, the engagement of the respective surfaces results in such a large frictional/compressive force holding the respective surfaces in contact that the surfaces remain locked or at least partially engaged when the force is reduced or removed. Thus, the range of operation of the respective devices is undesirably restricted and/or undesired dampening in the second direction occurs.

SUMMARY

According to aspects illustrated herein, there is provided a mechanical tensioner strut, including: a housing including a first internal space; a plunger at least partially disposed within the first internal space and including a first outer circumferential surface tapering in a first axial direction; a primary spring including a first end and a second end engaged with the housing; a wedge element disposed within the first internal space and including at least one first inner circumferential surface tapering in a second axial direction, opposite the first axial direction, and directly engageable with the first outer circumferential surface; and a secondary spring directly engaged with the wedge element and at least a portion of the plunger to urge the at least a portion of the plunger in the second axial direction. The primary spring urges the plunger in the second axial direction, with respect to the housing, with a first force. In a fully extended mode, the plunger is displaced a maximum distance in the second axial direction with respect to the housing. In a contracted mode, the plunger is displaced a second distance, with respect to the housing in the first axial direction, in response to application of a second force, greater by a first amount than the first force, on the plunger in the first axial direction. When the second force is decreased by a second amount, the plunger is configured to displace with respect to the housing in the second axial direction.

According to aspects illustrated herein, there is provided a mechanical tensioner strut, including a housing including a first internal space; a plunger including a nose and a slide. The nose is at least partially disposed within the first internal space and includes a second internal space and a first outer circumferential surface tapering in a first axial direction. The slide is at least partially disposed within the first and second internal spaces. The strut includes a spring and a wedge element. The spring includes a first end directly engaged with the housing and a second end directly engaged with the slide; and urges, with a first force, the slide in a second axial direction, opposite the first axial direction, with respect to the housing. The wedge element is disposed within the first internal space, is directly engaged with the slide, and includes at least one first inner circumferential surface tapering in the second axial direction and directly engageable with the first outer circumferential surface. In a fully extended mode, the nose is displaced a maximum distance in the second axial direction with respect to the housing. In a contracted mode, the nose is displaced in the first axial direction with respect to the housing, in response to application of a second force, greater by a first amount than the first force, on the nose in the first axial direction. When the second force is decreased by a second amount, the slide is configured to displace with respect to the housing in the second axial direction.

According to aspects illustrated herein, there is provided a method of dampening movement using a mechanical tensioner strut including: a housing including a first internal space; a plunger at least partially disposed within the first internal space and including a first outer circumferential surface tapering in a first axial direction; a primary spring including a first end and a second end engaged with the housing; a wedge element disposed within the first internal space and including at least one first inner circumferential surface tapering in a second axial direction, opposite the first axial direction, and directly engageable with the first outer circumferential surface; and a secondary spring directly engaged with the wedge element and at least a portion of the plunger. The method includes: applying, using the primary spring, a first force to the plunger; displacing the plunger in the second axial direction with respect to the housing; urging the at least a portion of the plunger in the second axial direction, with respect to the housing, with the secondary spring; displacing, using the primary spring, the plunger a maximum distance in the second axial direction with respect to the housing; applying a second force, greater by a first amount than the first force, to the plunger in the first axial direction; displacing the plunger in the first axial direction with respect to the housing; decreasing the second force by a second amount; and displacing the plunger with respect to the housing in the second axial direction.

According to aspects illustrated herein, there is provided a method of dampening movement using a mechanical tensioner strut including: a housing including a first internal space; a plunger including a nose at least partially disposed within the first internal space and including a second internal space and a first outer circumferential surface tapering in a first axial direction, and a slide at least partially disposed within the first and second internal spaces; a spring including a first end directly engaged with the housing and a second end directly engaged with the slide; and a wedge element disposed within the first internal space, directly engaged with the slide, and including at least one first inner circumferential surface tapering in the second axial direction and directly engageable with the first outer circumferential surface. The method includes: applying, using the primary spring, a first force to the slide; displacing the slide and the nose in a second axial direction, opposite the first axial direction, with respect to the housing; applying a second force, greater by a first amount than the first force, on the nose in the first axial direction; displacing the slide and the nose in the first axial direction with respect to the housing; decreasing the second force by a second amount; and displacing the slide and the nose with respect to the housing in the second axial direction.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
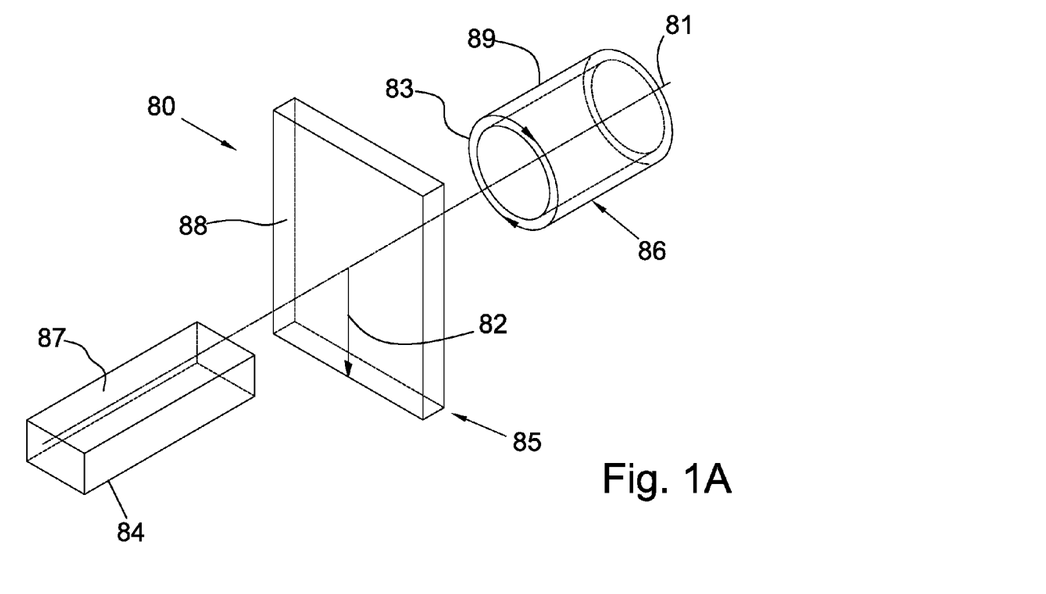
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
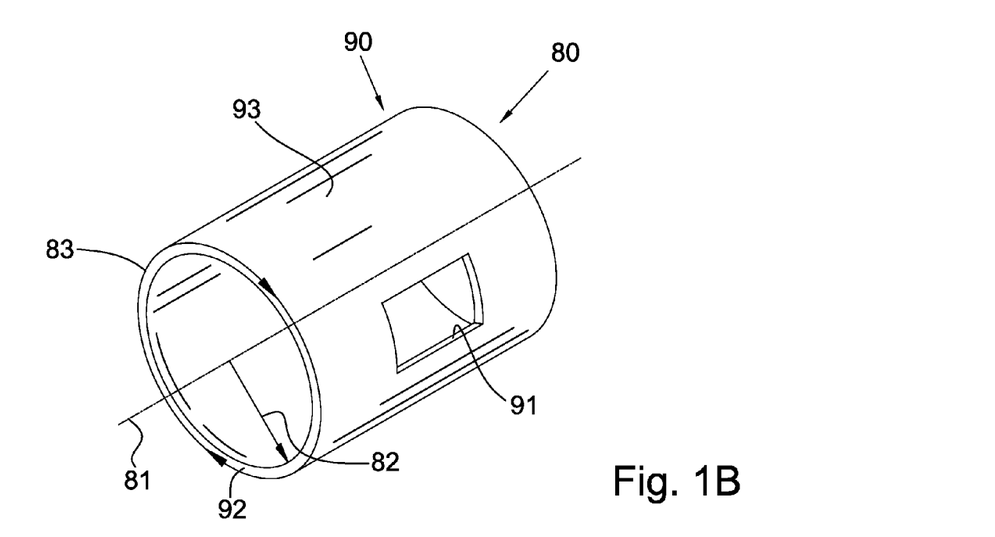
FIG. 1B is a perspective view of an object in the cylindrical coordinate system of FIG. 1A demonstrating spatial terminology used in the present application; and, FIG. 2 is a perspective view of a mechanical tensioner strut with secondary spring.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
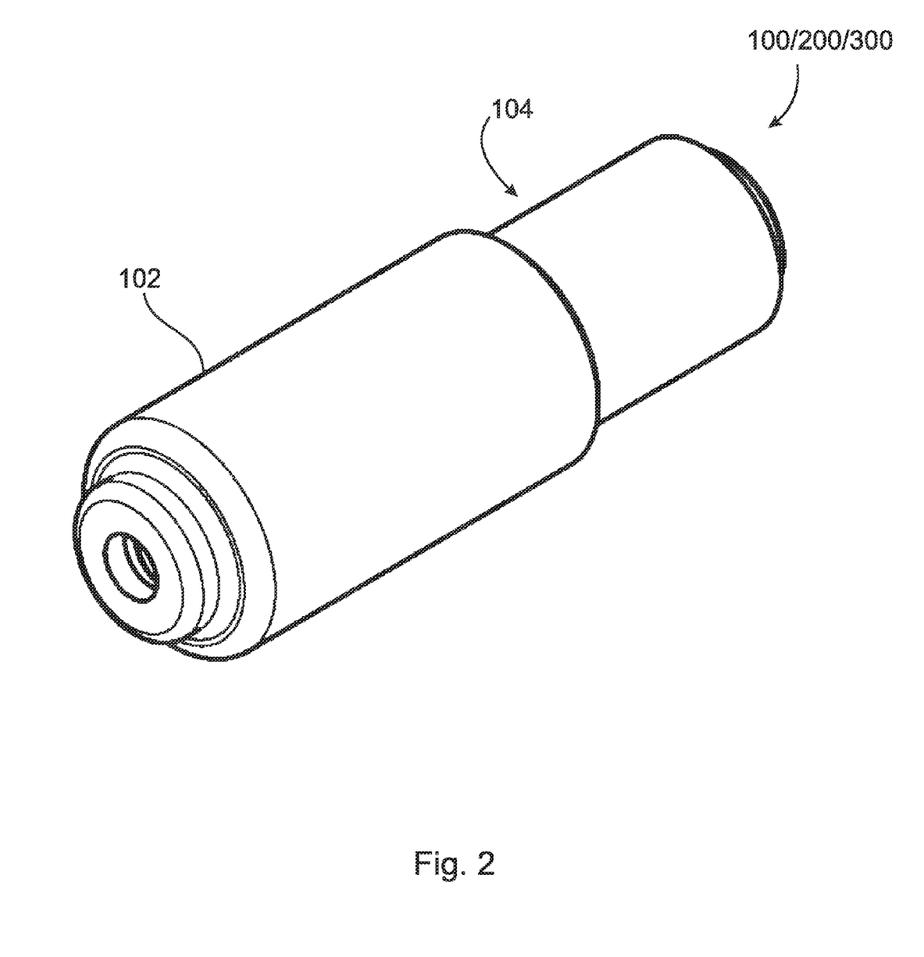

FIG. 2 is a perspective view of mechanical tensioner strut 100/200/300.

Figure 3:
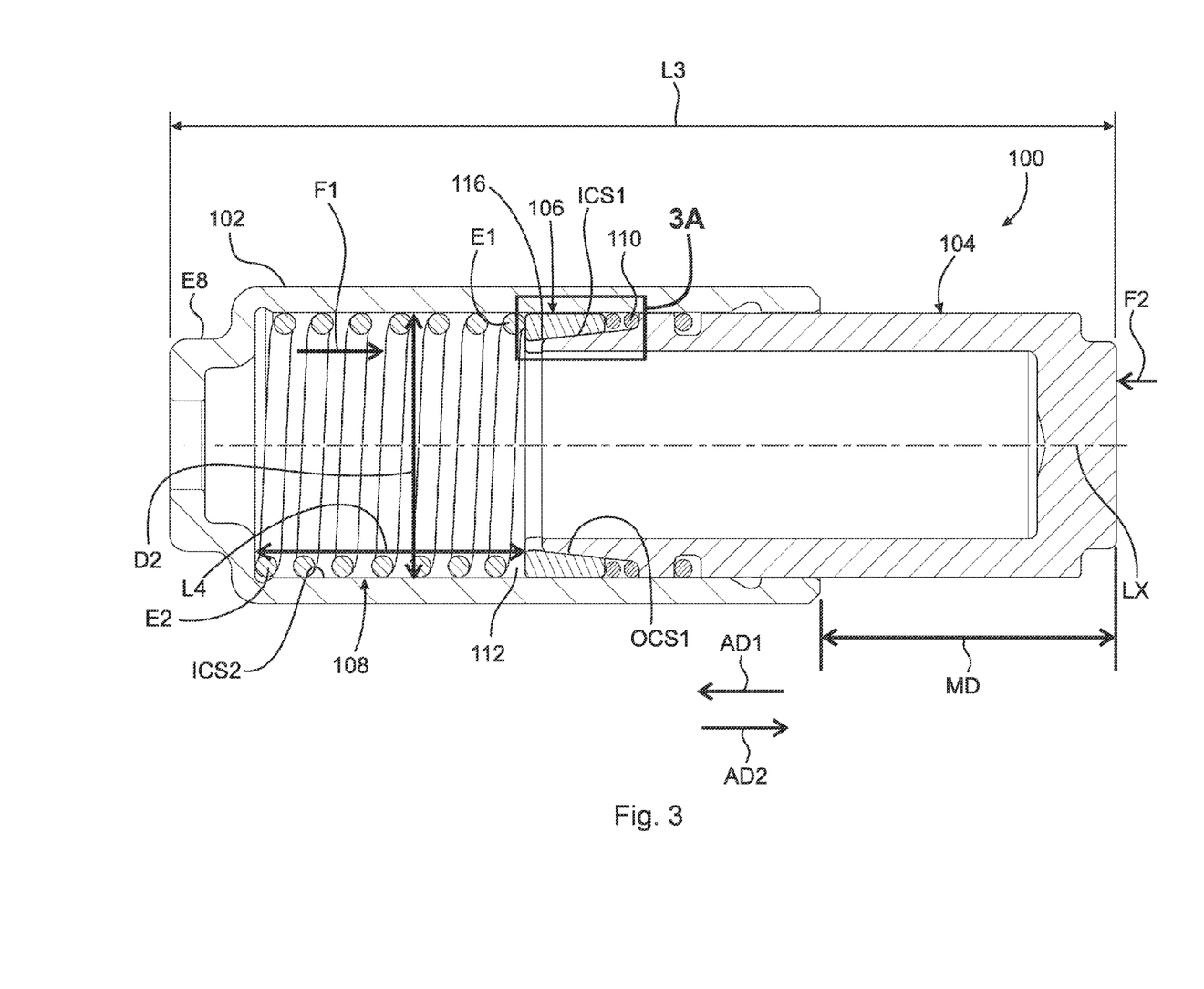
FIG. 3 is a cross-sectional view of the mechanical tensioner strut shown in FIG. 2 in a fully extended mode.

FIG. 3 is a cross-sectional view of mechanical tensioner strut 100 shown in FIG. 2 in a fully extended mode.

Figure 3A:
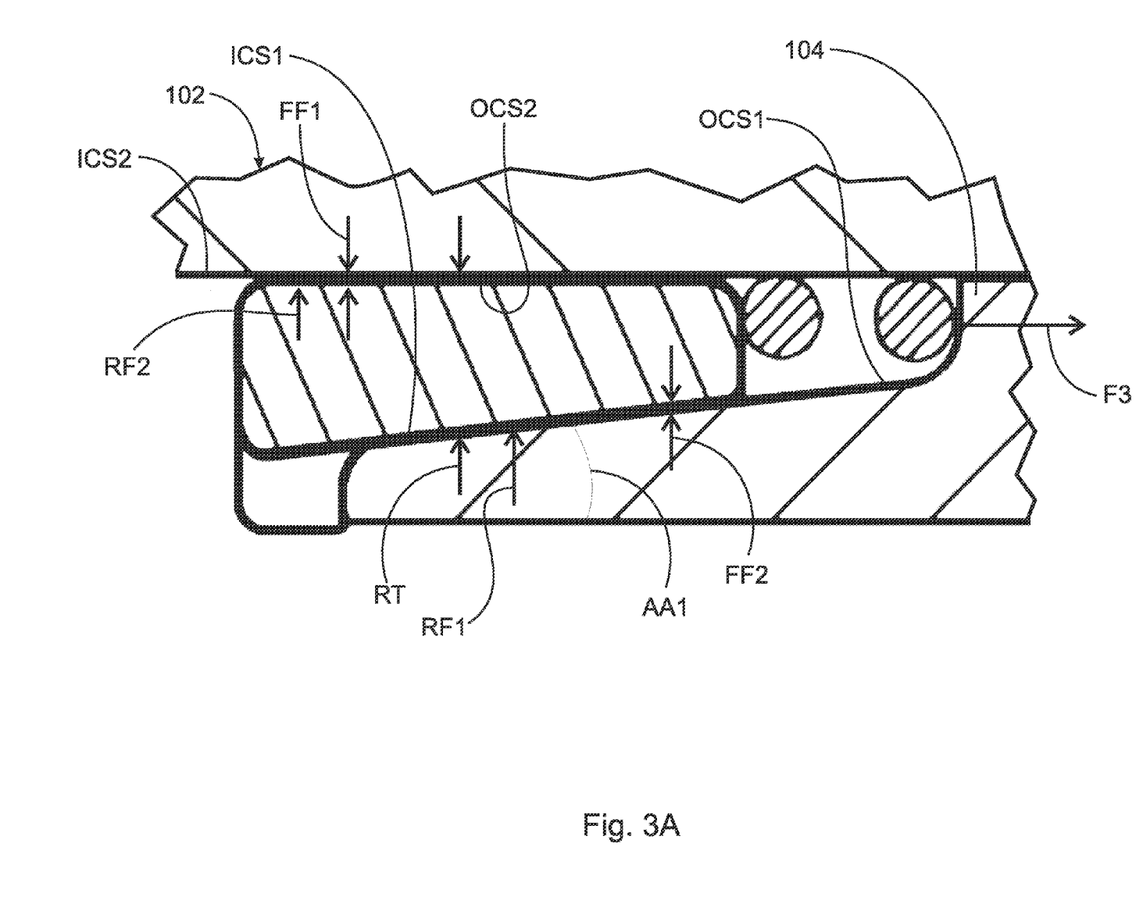
FIG. 3A is a detail of area 3A of FIG. 3.

FIG. 3A is a detail of area 3A of FIG. 3.

Figure 4:
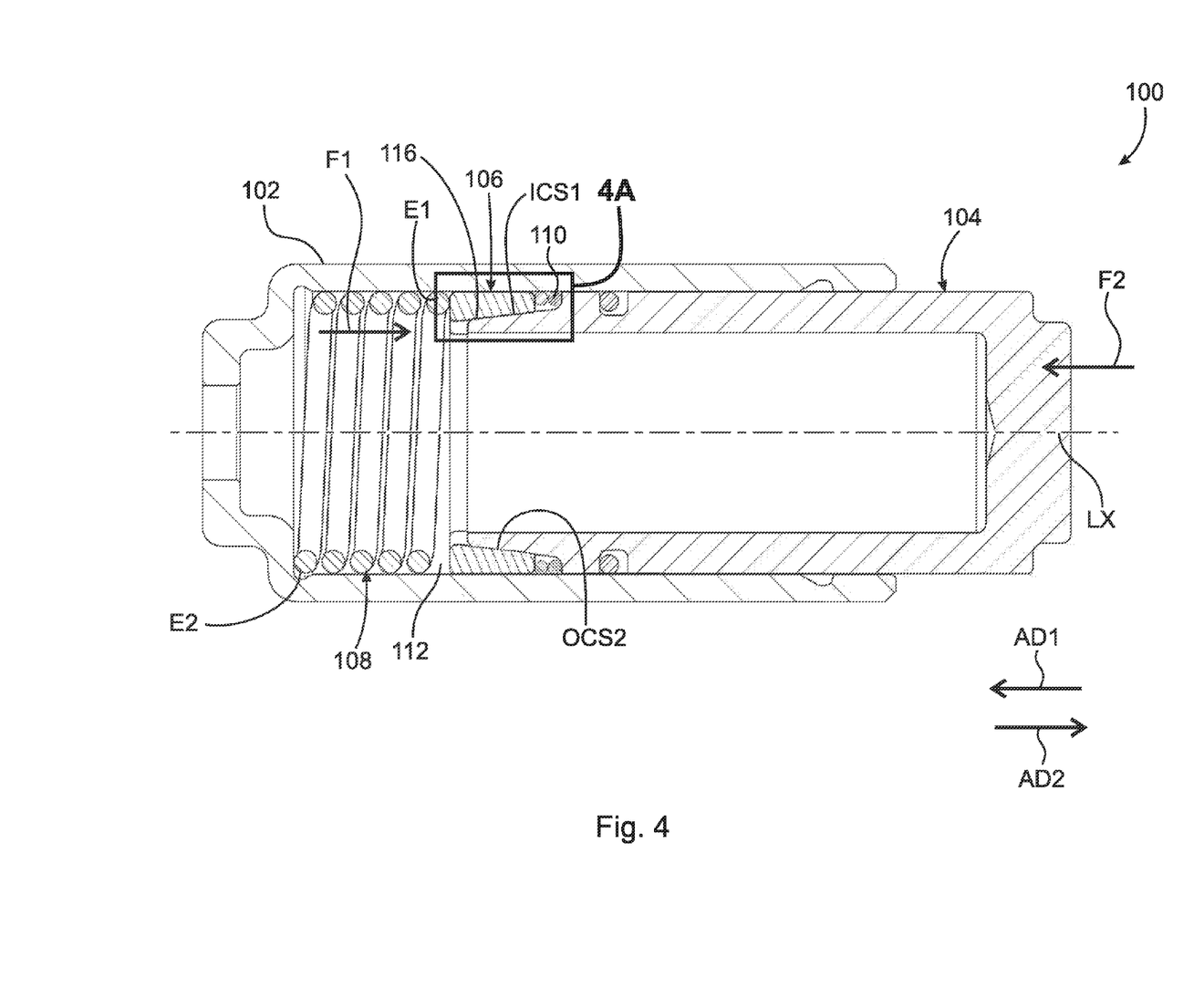
FIG. 4 is a cross-sectional view of the mechanical tensioner strut shown in FIG. 3 in the contracted mode.
Figure 4A:
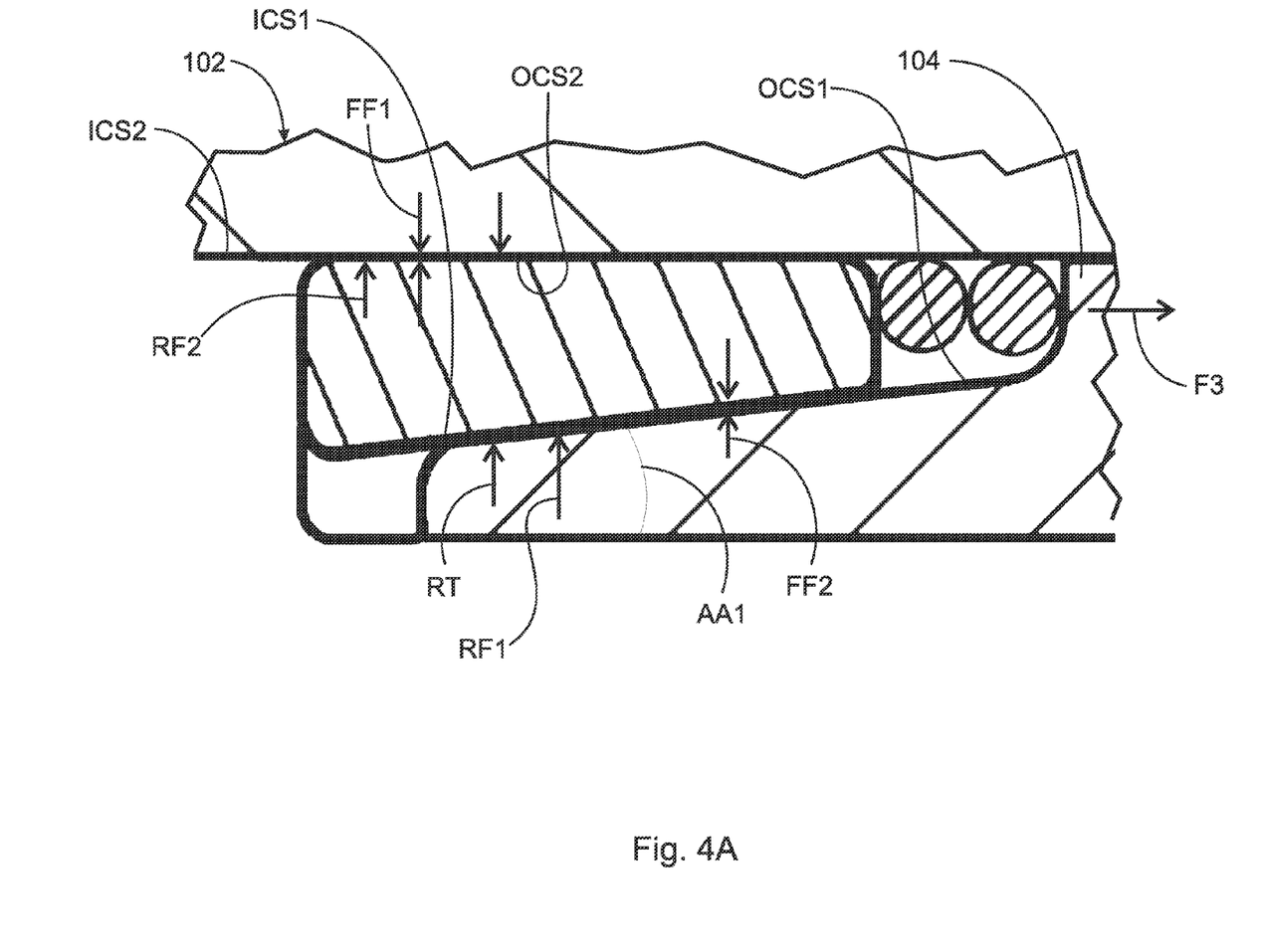
FIG. 4A is a detail of area 4A of FIG. 4.

FIG. 4 is a cross-sectional view of mechanical tensioner strut 100 shown in FIG. 3 in a contracted mode FIG. 4A is a detail of area 4A of FIG. 4.

Figure 5:
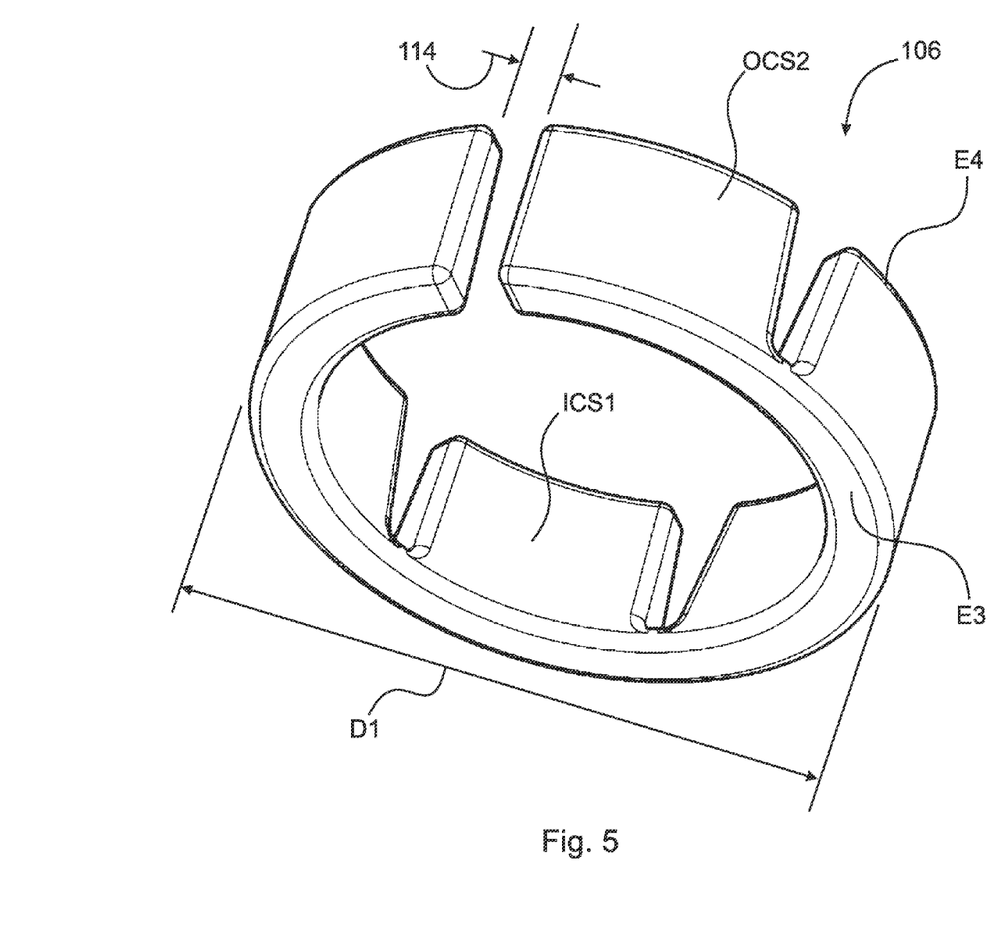
FIG. 5 is a perspective view of the wedge element shown in FIG. 2.

FIG. 5 is a perspective view of the wedge element shown in FIG. 2. The following should be viewed in light of FIGS. 2 through 5. Strut 100 includes housing 102, plunger 104, wedge element 106, primary spring 108, and secondary spring 110. In an example embodiment, the secondary spring is located radially outward of the primary spring. Housing 102 includes internal space 112. The plunger is at least partially disposed within space 112 and is axially displaceable with respect to the housing. The plunger includes outer circumferential surface OCS1 tapering in axial direction AD1. The wedge element is disposed within the space 112 and includes at least one inner circumferential surface ICS1 tapering in axial direction AD2, opposite AD1. Surface OCS1 is directly engaged with ICS1 as further described below. By "tapering" in an axial direction, we mean that a radial thickness of a component decreases in the direction of the taper. For example, radial thickness RT of the wedge element is greatest at end E3 and smallest at end E4.

Primary spring 108 includes end E1 directly engaged with the wedge element and end E2 directly engaged with the housing. In an example embodiment, spring 112 is in direct contact with one or both of the wedge element and the housing. The primary spring urges the plunger in axial direction AD2, with respect to the housing, with force F1. The secondary spring is directly engaged with at least a portion of the plunger and the wedge element to urge the portion of the plunger in direction AD2 with respect to the wedge element. The primary and secondary springs can be any spring or resilient element known in the art, for example including but not limited to a coil spring, a wave washer, or a Bellville spring, possessing the characteristics necessary to perform the functions described above and below. For instance, the respective spring rates of the primary and secondary springs can be selected according to application requirements.

In a fully extended mode, for example as shown in FIG. 3, the plunger is displaced maximum distance MD in direction AD2 with respect to the housing. In a contracted mode, for example as shown in FIG. 4, the plunger is displaced in direction AD1 with respect to the housing, in response to application of force F2 on the plunger in direction AD1. F2 is at least greater than force F1 by an amount of friction force FF1, generated by contact between at least one outer circumferential surface OCS2 of the wedge element and inner circumferential surface ICS2 of the housing, opposing the movement of the plunger in axial direction AD1. When F2 is decreased by a sufficient amount, the plunger is configured to displace with respect to the housing in direction AD2. In a fully contracted mode, spring 104 is fully compressed and the plunger is displaced to a maximum extent in direction AD1 with respect to the housing. In actual operation, strut 100 can at various times be in intermediate states between a fully extended and a fully contracted mode.

When the plunger is displaced in direction AD1, friction force FF1 is generated as noted above. Also, during displacement of the plunger in direction AD1, ICS1 contacts OCS1 to urge OCS2 radially outward to increase FF1. For example, as OCS1 slides along ICS1 in direction AD1, OCS1 applies radially outward force RF1 to ICS1, which in turn urges OCS2 against ICS2 with radially outward force RF2 to increase FF1. The wedge element displaces in direction AD1 against F1 and FF2, advantageously increasing the dampening in direction AD1. In an example embodiment, in the absence of RF2, FF1 has a nominal value as described below.

As noted above, in the contracted mode, radial forces RF1 and RF2 and friction forces FF1 and FF2 are generated, or are present. To enable un-dampened displacement of the plunger in direction AD2 (the transition from the contract mode to the extended mode when force F2 is reduced), FF1 must be reduced to a sufficiently small magnitude. To accomplish this, the plunger must displace in direction AD2 with respect to the wedge element to reduce RF1 and RF2. To enable the displacement of the plunger in direction AD2, force FF2 must be overcome. Advantageously, the secondary spring urges the plunger in direction AD2 with force F3 which, in combination with force FF1, is sufficient to displace the plunger in direction AD2 with respect to the wedge element. That is, FF2 is less than the sum of FF1 and F3. In general, to optimize damping in direction AD1, FF2 is at least equal to FF1. In this case, without force F3, the plunger is not displaceable in direction AD2 with respect to the wedge element.

In an example embodiment, wedge element 106 includes circumferential gap 114. In a free/un-installed state, the wedge element has an outside diameter D1 less than diameter D2 of space 112. Thus, when the wedge element is installed in space 112, the wedge element radially contracts such that gap 114 is reduced and diameter D1 is substantially equal to D2. The reduction of gap 114 and D1 results in OCS2 exerting nominal force FF1 mentioned above in the absence of RF2. In general, nominal force FF1 is adequate to maintain an axial position of the wedge element in the absence of axial forces on the wedge element, while minimizing resistance to axial displacement of the wedge element in direction AD2.

In an example embodiment, circumferential surface OCS1 or ICS1 is at acute angle AA1 of between 5 and 20 degrees with respect to longitudinal axis LX for strut 100 and OCS1 and ICS1 are substantially parallel. Decreasing angle AA1 desirably increases dampening in direction AD1 and as noted above, force F3 provided by the secondary spring enables the angle to be decreased.

In an example embodiment, coating 116 is applied to one or both of surfaces OCS1 or ICS1 to reduce the magnitude of FF2, which further enables a reduction of AA1 or F3. Any coating known in the art can be used.

Figure 6:
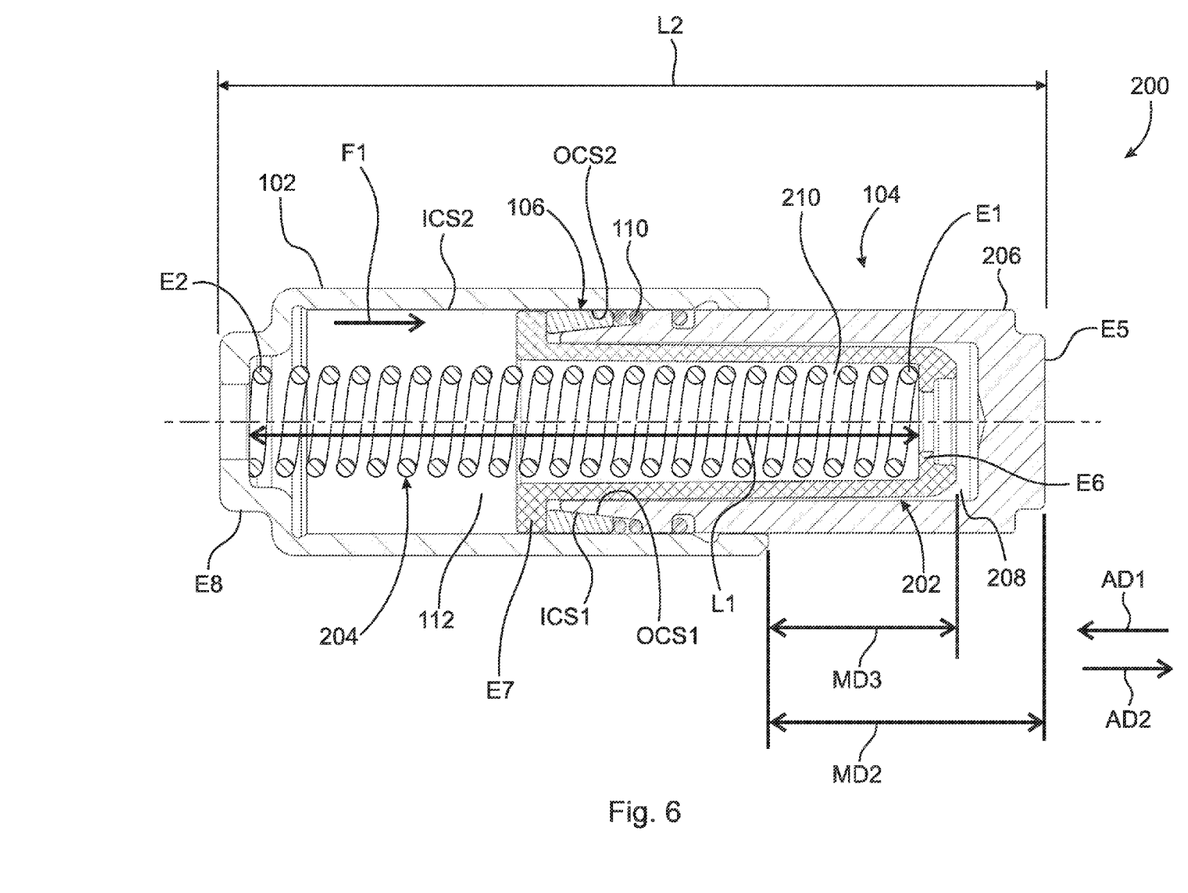
FIG. 6 is a cross-sectional view of the mechanical tensioner strut shown in FIG. 2 with a slide and in a fully extended mode.

FIG. 6 is a cross-sectional view of mechanical tensioner strut 200 shown in FIG. 2 with slide 202 and in an extended mode.

Figure 7:
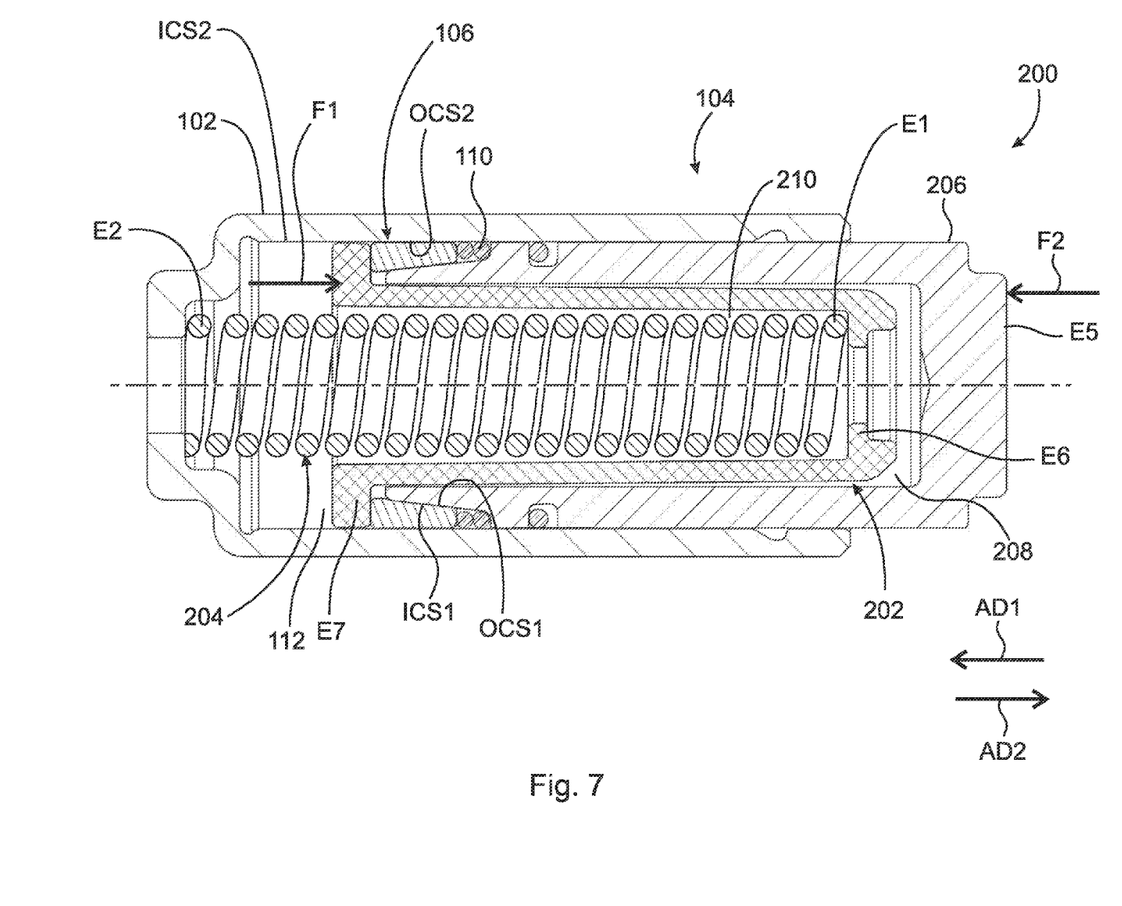
FIG. 7 is a cross-sectional view of the mechanical tensioner strut shown in FIG. 6 in a contracted mode.

FIG. 7 is a cross-sectional view of mechanical tensioner strut 200 shown in FIG. 6 in a contracted mode. The following should be viewed in light of FIGS. 2 through 7. Strut 200 includes housing 102, plunger 104, wedge element 106, primary spring 204, and secondary spring 110. Housing 102 includes internal space 112. Plunger 104 includes slide 202 and nose 206. The nose is at least partially disposed within internal space 112 and includes internal space 208 and distal end E5 arranged to receive F2. The slide is at least partially disposed within spaces 112 and 208 and includes internal space 210 partially enclosing the primary spring, end E6 directly engaged with end E1 of the primary spring and end E7 directly engaged with the wedge element. End E2 of the primary spring is directly engaged with the housing.

In the fully extended mode, for example, as shown in FIG. 6, the nose and slide are each displaced maximum distances MD2 and MD3, respectively, in direction AD2 with respect to the housing. In a contracted mode, for example as shown in FIG. 7, the nose and slide are displaced in direction AD1 with respect to the housing, in response to application of force F2 on the plunger in direction AD1. F2 is at least greater than force F1 by amount FF1 described above. When F2 is decreased by a sufficient amount, the nose and slide are configured to displace with respect to the housing in direction AD2. In a fully contracted mode, spring 204 is fully compressed and the nose and slide are displaced to a maximum extent in direction AD1 with respect to the housing. In actual operation, strut 200 can at various times be in intermediate states between a fully extended and a fully contracted mode.

The nose includes outer circumferential surface OCS1 tapering in axial direction AD1. The wedge element is disposed within space 112 and includes at least one inner circumferential surface ICS1 tapering in axial direction AD2, opposite AD1. Surface OCS1 is directly engaged with ICS1 as further described below.

The primary spring urges the slide, and subsequently, the wedge element and nose, in axial direction AD2, with respect to the housing, with force F1. The secondary spring is directly engaged with the nose and the wedge element to urge the nose in direction AD2 with respect to the wedge element. The primary and secondary springs can be any spring or resilient element known in the art, for example including but not limited to a coil spring, a wave washer, or a Bellville spring, possessing the characteristics necessary to perform the functions described above and below. For instance, the respective spring rates of the primary and secondary springs can be selected according to application requirements.

The fundamental operation of strut 200 is similar to the operation of strut 100 with the exception that in strut 100 the primary spring directly engages the wedge element, while in strut 200, the primary spring directly engage the slide, which in turn directly engages the wedge element.

FIGS. 3A and 4A are applicable to the following discussion with the understanding that force from the primary spring in direction AD2 is applied to the wedge element indirectly by slide 202. When the nose is displaced in direction AD1, friction force FF1 is generated. Also, during displacement of the plunger in direction AD1, ICS1 contacts OCS1 to urge OCS2 radially outward to increase FF1. For example, as OCS1 slides along ICS1 in direction AD1, OCS1 applies radially outward force RF1 to ICS1, which in turn urges OCS2 against ICS2 with radially outward force RF2 to increase FF1. Note that in the absence of RF1, FF1 has a nominal value as described above. As the wedge element displaces in direction AD1, the wedge element pushes the slide element in direction AD1 against F1 and FF1, advantageously increasing the dampening in direction AD1.

As noted above, in the contracted mode, radial forces RF1 and RF2 and friction forces FF1 and FF2 are generated, or are present. To enable un-dampened displacement of the plunger in direction AD2 (the transition from the contract mode to the extended mode when force F2 is reduced), FF1 must be reduced to a sufficiently small magnitude. To accomplish this, the nose must displace in direction AD2 with respect to the wedge element to reduce RF1 and RF2. However, to enable the displacement of the nose in direction AD2, force FF2 must be overcome.

Advantageously, the secondary spring urges the nose in direction AD2 with force F3 which, in combination with force FF1, is sufficient to displace the nose in direction AD2 with respect to the wedge element. That is, FF2 is less than the sum of FF1 and F3. In general, to optimize damping in direction AD1, FF2 is at least equal to FF1. Thus, without force F3, the nose is not displaceable in direction AD2 with respect to the wedge element. Once FF2 is reduced, the slide displaces in direction AD2, subsequently displacing the wedge element and nose.

Figure 8:
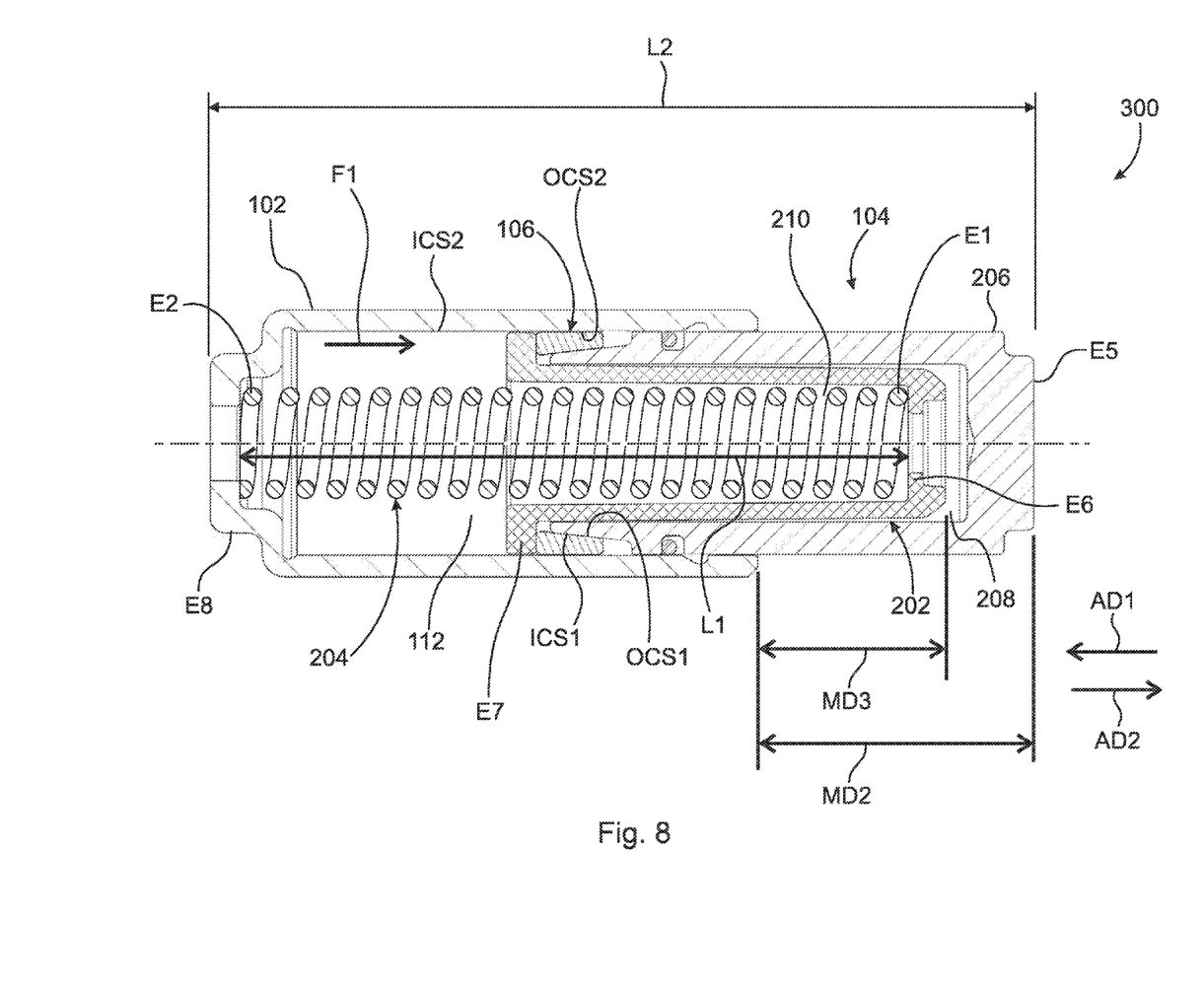
FIG. 8 is a perspective view of the mechanical tensioner shown in FIG. 2 in a fully extended mode; and, FIG. 9 is a perspective view of the mechanical tensioner strut shown in FIG. 8 in a contracted mode.

FIG. 8 is a perspective view of the mechanical tensioner strut shown in FIG. 2 in an extended mode.

Figure 9:
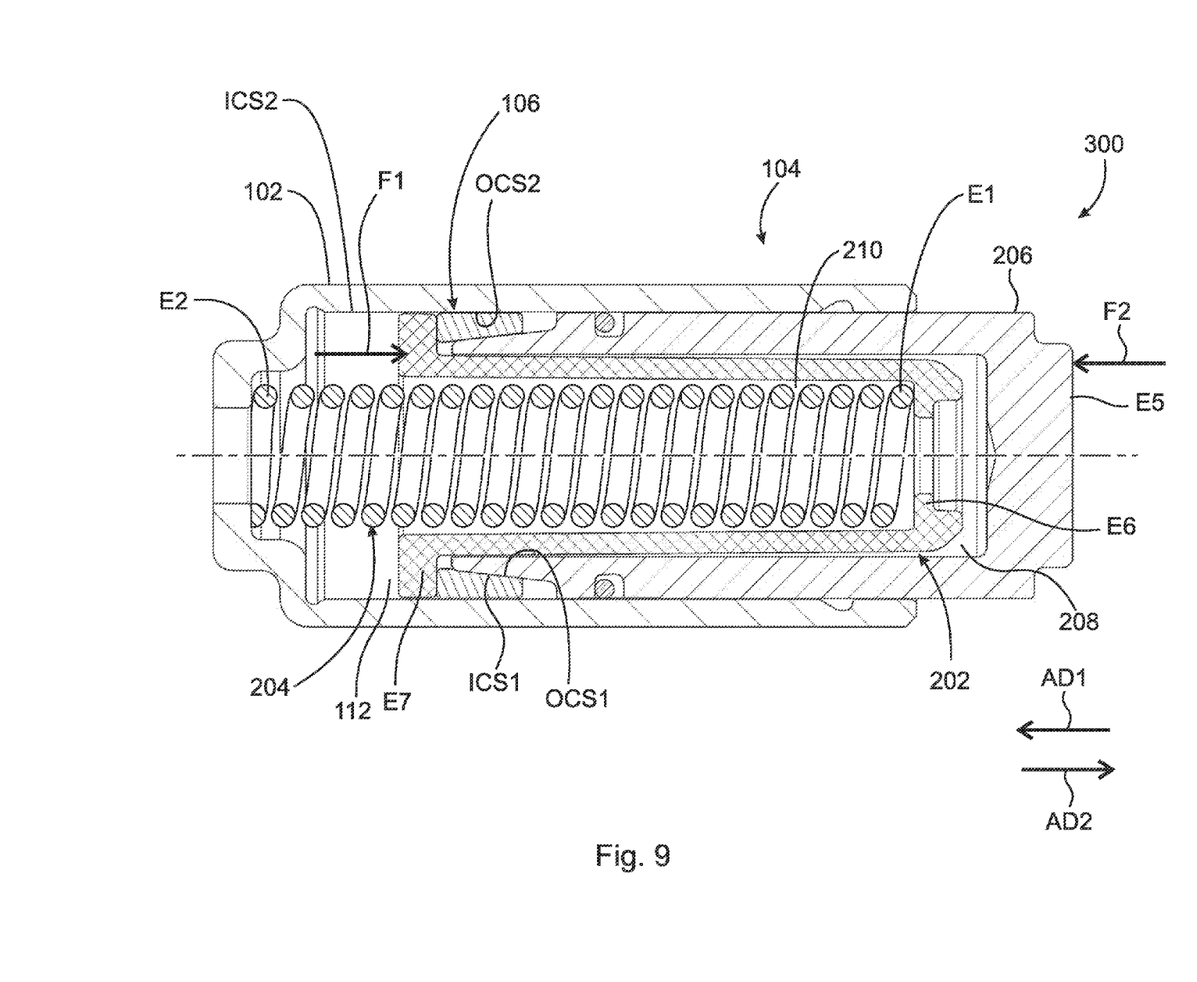

FIG. 9 is a perspective view of the mechanical tensioner strut shown in FIG. 8 in a contracted mode. The following should be viewed in light of FIGS. 8 and 9. Strut 300 includes housing 102, plunger 104, wedge element 106, and spring 204. Housing 102 includes internal space 112. Plunger 104 includes slide 202 and nose 206. The nose is at least partially disposed within internal space 112 and includes internal space 208 and distal end E5 arranged to receive F2. The slide is at least partially disposed within spaces 112 and 208 and includes internal space 210 partially enclosing the primary spring, end E6 directly engaged with end E1 of the primary spring and end E7 directly engaged with the wedge element. End E2 of the primary spring is directly engaged with the housing.

In the fully extended mode, for example, as shown in FIG. 8, the nose and slide are each displaced maximum distances MD2 and MD3, respectively, in direction AD2 with respect to the housing. In a contracted mode, for example as shown in FIG. 9, the nose and slide are displaced in direction AD1 with respect to the housing, in response to application of force F2 on the plunger in direction AD1. F2 is at least greater than force F1 by amount FF1.

When F2 is decreased by a sufficient amount, the nose and slide are configured to displace with respect to the housing in direction AD2. In a fully contracted mode, spring 204 is fully compressed and the nose and slide are displaced to a maximum extent in direction AD1 with respect to the housing. In actual operation, strut 300 can at various times be in intermediate states between a fully extended and a fully contracted mode.

The nose includes outer circumferential surface OCS1 tapering in axial direction AD1. The wedge element is disposed within space 112 and includes at least one inner circumferential surface ICS1 tapering in axial direction AD2, opposite AD1. Surface OCS1 is directly engaged with ICS1.

The spring urges the slide, and subsequently, the wedge element and nose, in axial direction AD2, with respect to the housing, with force F1. The spring can be any spring or resilient element known in the art, for example including but not limited to a coil spring, a wave washer, or a Bellville spring, possessing the characteristics necessary to perform the functions described above and below. For instance, the spring rates of the spring can be selected according to application requirements.

Regarding struts 100 and 200, as noted above; to maximize desired dampening in direction AD1, frictional force FF1 generated by contact of the wedge element with the housing should be maximized. Advantageously, angle AA1 is minimized to increase RF1 and RF2, which subsequently increases FF1. However, as noted above, increasing frictional forces can cause the strut to jam in the contracted mode or can result in undesirable dampening in direction AD2 (FF1 and FF2 are not adequately reduced). Advantageously, the secondary spring offsets the desirable increase in friction forces by providing a means to overcome the increase in force FF2 between the wedge and the plunger. That is, the force from the secondary spring advantageously enables the plunger to displace with respect to the wedge element in direction AD2, desirably reducing RF1 and RF2 and subsequently, FF1.

Regarding struts 200 and 300, the use of a nose/slide configuration advantageously enables a longer length L1 for spring 204 than is possible for spring 104 in strut 100. Increasing length L1 results in a desirable increase in spring force. The increase in spring force advantageously increases the desired dampening in direction AD2.

Struts 200 and 300 provide the following advantages:
1. The overall length L2 of strut 200 or 300 can be less than overall length L3 of strut 100 for a given stroke requirement. The length of the primary spring is proportional to the stroke requirement. In strut 100, length L4 between end E8 of the housing and the wedge element is available for spring 108. However, in strut 200 or 300, length L1 available for spring 204, between end E8 and end E6 of the slide is considerably greater. Therefore, for a same size housing and nose/plunger, L1 is longer than L4. Thus, for strut 100 to include spring 108 comparable to spring 204 in performance, length L4, and hence length L3, would need to be increased.

2. Provide reduced variability in the return spring force over the tensioner stroke range, thereby reducing the average tensioner force. This is due to the fact that for a same stroke performance, length L4 is less than length L1 and the spring rate for 204 is less than the spring rate for 108.

3. Because length L1 is less than length L4 for a same stroke performance, the likelihood of spring 204 fully compressing is reduced, which in turn reduces possible damage to spring 204.

4. Because length L1 is less than length L4 for a same stroke performance, spring 204 is generally compressed to a lesser degree than spring 108 over the respective operating ranges of the struts, which reduces fatigue and increases primary spring life.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A mechanical tensioner strut, comprising:
a housing including a first internal space;
a plunger at least partially disposed within the first internal space and including a first outer circumferential surface tapering in a first axial direction;
a primary spring including a first end and a second end engaged with the housing;
a wedge element disposed within the first internal space and including at least one first inner circumferential surface tapering in a second axial direction, opposite the first axial direction, and directly engageable with the first outer circumferential surface; and,
a secondary spring directly engaged with the wedge element and at least a portion of the plunger to urge the at least a portion of the plunger in the second axial direction, wherein the secondary spring is at least partially aligned with the primary spring in the first or second axial direction, wherein:
the primary spring urges the plunger in the second axial direction, with respect to the housing, with a first force;
in a fully extended mode, the plunger is displaced a maximum distance in the second axial direction with respect to the housing;
in a contracted mode, the plunger is displaced a second distance, with respect to the housing, in the first axial direction in response to application of a second force, greater by a first amount than the first force, on the plunger in the first axial direction; and,
when the second force is decreased by a second amount, the plunger is configured to displace with respect to the housing in the second axial direction.

2. The mechanical tensioner strut of claim 1, wherein when the plunger is displaced in the first axial direction:
the wedge element is displaced in the first axial direction; and,
a first friction force, opposing displacement of the plunger and the wedge element in the first axial direction, is generated between a second inner circumferential surface of the housing and at least one second outer circumferential surface of the wedge element.

3. The mechanical tensioner strut of claim 2, wherein during displacement of the plunger in the first axial direction, the first outer circumferential surface contacts the at least one first inner circumferential surface to urge the at least one second outer circumferential surface radially outward to increase the first friction force.

4. The mechanical tensioner strut of claim 1, wherein in the contracted mode:
a first friction force is generated between the first outer circumferential surface and the at least one first inner circumferential surface;
a second frictional force is generated between at least one second outer circumferential surface of the wedge element and a second inner circumferential surface of the housing;
the secondary spring urges the at least a portion of the plunger in the second axial direction with a third force; and,
the first frictional force is less than the sum of the second frictional force and the third force.

5. The mechanical tensioner strut of claim 4, wherein the first frictional force is at least equal to the second frictional force.

6. The mechanical tensioner strut of claim 4, wherein in the contracted mode, when the second force is decreased by the second amount:
the secondary spring displaces the at least a portion of the plunger in the second axial condition with respect to the wedge element; and,
a magnitude of the second frictional force is reduced.

7. The mechanical tensioner strut of claim 4, wherein in the contracted mode:
the first outer circumferential surface contacts the at least one first inner circumferential surface to urge the at least one second outer circumferential surface against the second inner circumferential surface with a radial force; and,
when the second force is decreased by the second amount, at least a portion of the plunger displaces in the second axial condition to reduce a magnitude of the radial force.

8. The mechanical tensioner strut of claim 1, wherein the first outer circumferential surface or the at least one first inner circumferential surface is at a first angle of between 5 and 20 degrees with respect to a longitudinal axis for the mechanical tensioner strut.

9. The mechanical tensioner strut of claim 1, wherein the at least one first inner circumferential surface or the first outer circumferential surface includes a friction-reducing coating.

* * * * *